United States Patent
Zheng et al.

(10) Patent No.: US 8,225,057 B1
(45) Date of Patent: Jul. 17, 2012

(54) SINGLE-SYSTEM CONFIGURATION FOR BACKING-UP AND RESTORING A CLUSTERED STORAGE SYSTEM

(75) Inventors: Ling Zheng, Sunnyvale, CA (US); Ajith Balachandran, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 622 days.

(21) Appl. No.: 12/410,308

(22) Filed: Mar. 24, 2009

(51) Int. Cl.
*G06F 12/00* (2006.01)

(52) U.S. Cl. .. 711/162; 711/165; 711/114; 711/E12.001

(58) Field of Classification Search .................. 711/114, 711/161, 162, 165, 202, 203, E12.001
See application file for complete search history.

(56) References Cited

U.S. PATENT DOCUMENTS

| | | | | |
|---|---|---|---|---|
| 6,957,303 | B2 * | 10/2005 | Fujimoto et al. | 711/114 |
| 8,078,622 | B2 * | 12/2011 | Rabii et al. | 707/737 |
| 2007/0101083 | A1 * | 5/2007 | Ogihara et al. | 711/165 |
| 2008/0077636 | A1 * | 3/2008 | Gupta et al. | 707/204 |

* cited by examiner

*Primary Examiner* — Pierre-Michel Bataille
(74) *Attorney, Agent, or Firm* — Perkins Coie LLP

(57) ABSTRACT

A method implements a single system configuration for backing-up and restoring a clustered storage system. The clustered storage system contains a plurality of storage servers. A virtual volume is configured based on one or more of the plurality of storage servers. The virtual volume shields its physical implementation from a client system. A virtual backup device is configured based on a physical backup device connected with one of the plurality of storage servers. The virtual backup device shields its connectivity from the client system. The method backs-up volume data stored in the virtual volume to the virtual backup device, irrespective of which of the plurality of storage servers is utilized by the virtual volume, or which of the plurality of storage servers is connected with the physical backup device.

27 Claims, 9 Drawing Sheets

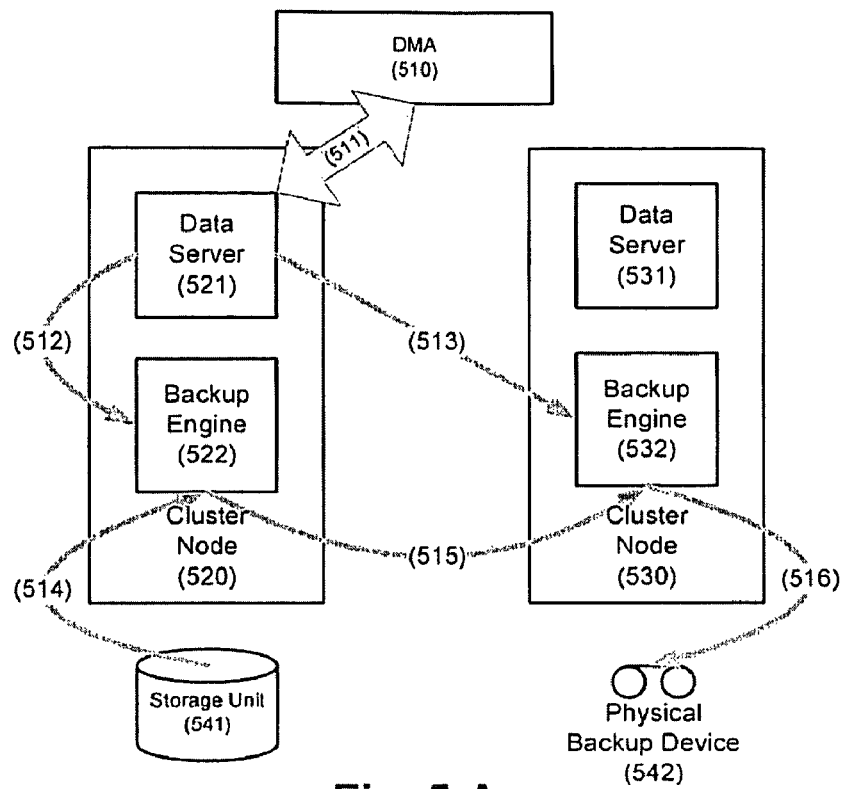
Fig. 5-A
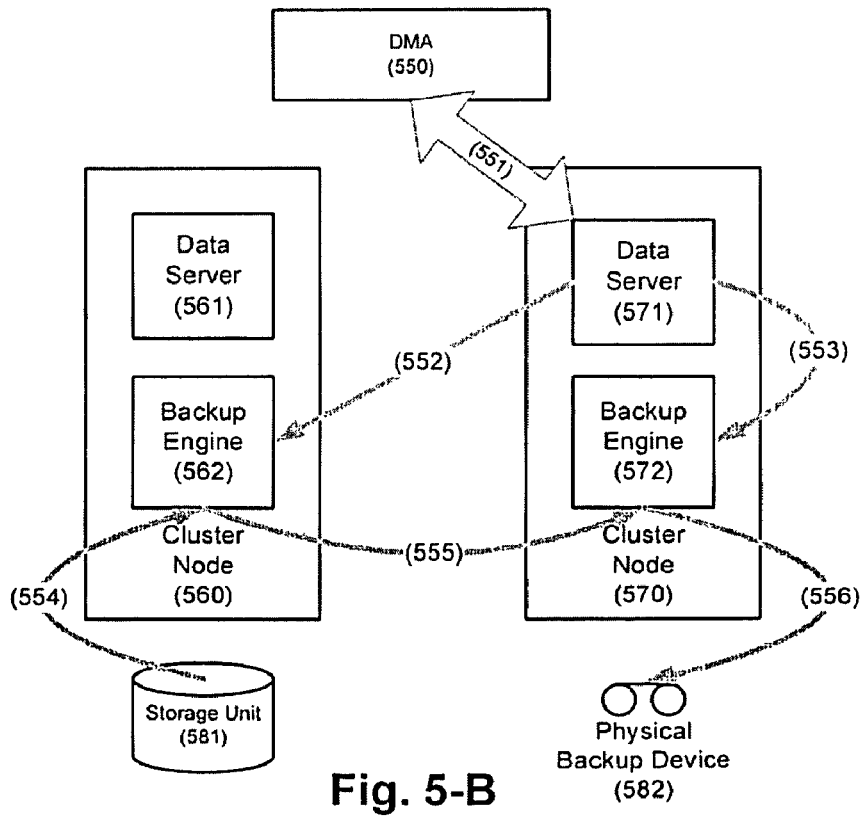
Fig. 5-B

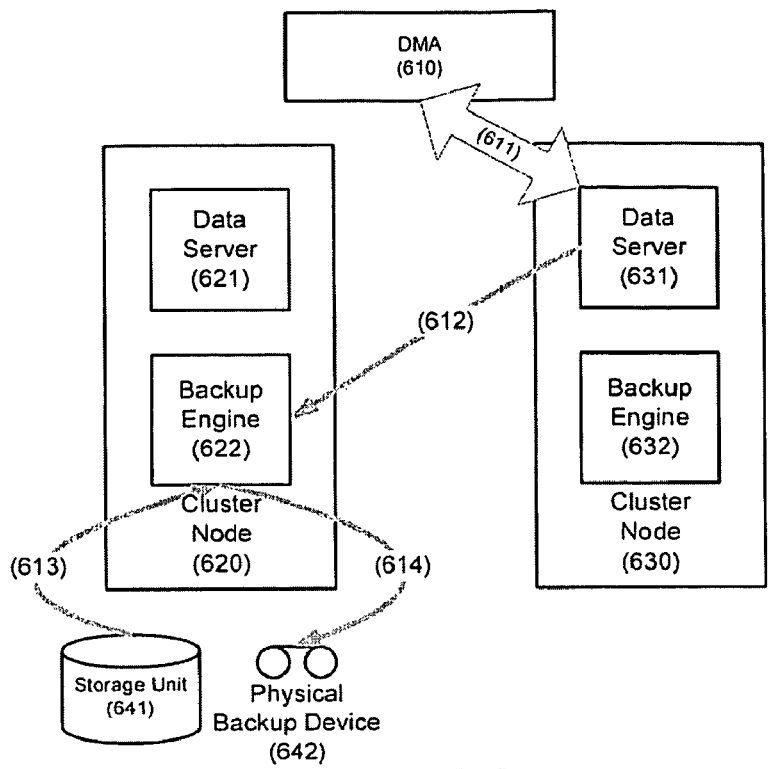
Fig. 6-A
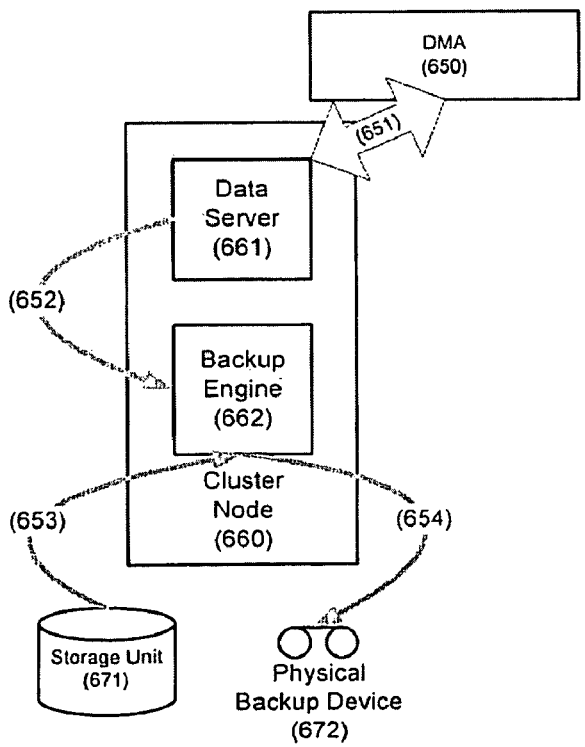
Fig. 6-B

SINGLE-SYSTEM CONFIGURATION FOR BACKING-UP AND RESTORING A CLUSTERED STORAGE SYSTEM

FIELD OF THE INVENTION

At least one embodiment of the present invention pertains to network storage systems, and more particularly, to the implementation of a single-system configuration for backing-up and restoring a clustered storage system.

BACKGROUND

A storage server is a computer system and a form of storage controller that is used to store and retrieve data on behalf of one or more clients on a network. A storage server operates on behalf of one or more clients to store and manage data in a set of mass storage devices, such as magnetic or optical storage-based disks or tapes. A storage server may be configured to service file-level requests from clients, as in the case of file servers used in a Network Attached Storage (NAS) environment. Alternatively, a storage server may be configured to service block-level requests from clients, as done by storage servers used in a Storage Area Network (SAN) environment. Further, some storage servers are capable of servicing both file-level and block-level requests, such as certain storage servers made by NetApp®, Inc. of Sunnyvale, Calif.

In order to preserve the data stored in a storage server, a data management application (DMA) can be utilized to backup such data to a secondary storage system. If necessary, the backed-up data can then be used to recover the storage server in a restore operation. For easy management, the DMA can also configure these backup and restore operations by using a set of pre-defined data redundancy policies. A data redundancy policy identifies the storage entities in the storage server to be backed up or restored, and the backup storage devices that can be used for such backup/restore operations. Once the data redundancy policies are defined, the DMA can streamline the backup and restore operations by automatically invoking commands according to the policies. Further, these data redundancy policies allow the DMA to log the backup events and track the location of backed-up data.

During configuration of data redundancy policies, the DMA can browse the storage entities and the backup storage devices along with their physical configurations. For example, a storage volume provided by a storage server is viewed by the DMA as a storage volume physically located in such storage server. Or a backup tape drive that is connected to a particular storage server is also likely presented to the DMA. Thus, the data redundancy policies, which are configured based on the storage entities and backup storage devices, become closely coupled with the physical configurations of these storage entities and backup devices. When a data redundancy policy is invoked to backup data to a tape drive, the DMA often can communicate with the storage server that supplies the storage entity and the storage server that is connected to the tape drive, and coordinate the transmitting of data from the storage entity to the tape drive. Thus, the physical configurations of the storage entities and backup storages devices allow the DMA to perform its backup/restore functions based on the data redundancy policies.

However, when the physical configurations of the storage entities and backup storage devices change, the data redundancy policies that depend on these physical configurations may no longer be valid. For example, if a storage server or a storage entity contained therein is moved, renamed, deleted, or becomes inoperative, initiating a backup/restore operation on a non-existent or inaccessible storage server or storage entity cannot proceed successfully. Likewise, if a tape drive is no longer accessible, none of the data redundancy policies that depend on the tape drive can store or retrieve data from such tape drive, even if there are other backup storage devices available and accessible. In these situations, the data redundancy policies must be reconfigured to utilize the new or changed storage entities or backup devices. However, once a data redundancy policy is updated, the previous logged backup/restore events, as well as the backed-up data, may no longer be traceable based on the updated data redundancy policy.

To improve storage availability and performance, multiple individual storage servers can be integrated into a clustered storage system, which provides load-balance and/or fail-over capabilities. In a clustered storage system, the physical configurations of each individual storage server become less important. However, a conventional DMA can only configure data redundancy policies based on individual storage servers. Thus, the data redundancy policies configured by the conventional DMA cannot take advantage of the benefits provided by the clustered storage system. In certain cases, they might be crippled by the special physical configurations of the clustered storage system. For example, a specific storage entity can be moved from one storage server to another storage server in a clustered storage system. Or one specific storage server can be failed-over to another storage server in the same clustered storage system. In these situations, the conventional data redundancy policies, which are closely coupled with the specific storage entity or the storage server, may become stale.

Further, when a single set of data is stored across multiple storage servers in the clustered storage system, the data redundancy policies for an individual storage server would have difficulty in retrieving the whole set of data from a single storage server. And, backing-up a fraction of the data serves little purpose in data restoration. Additionally, to increase availability and flexibility, a storage server in a clustered storage system is often un-identifiable to external applications. Thus, a conventional DMA may no longer be able to browse or retrieve the detailed file system information from an individual storage server in a clustered storage system. Without an alternative naming or accessing mechanism, the DMA loses its capability for accessing data stored in the individual storage servers, and becomes ineffective in the management of the backup/restore operations for the clustered storage system.

BRIEF DESCRIPTION OF THE DRAWINGS

One or more embodiments of the present invention are illustrated by way of example and not limitation in the figures of the accompanying drawings, in which like references indicate similar elements and in which:

FIG. 5-A illustrates a scenario in which two cluster nodes are involved in backing-up data from a virtual volume to a virtual backup device, and the physical backup device cannot be locally accessed from one of the cluster nodes;

FIG. 5-B illustrates a scenario in which two cluster nodes are involved in backing-up data from a virtual volume to a virtual backup device, and the physical backup device can be locally accessed from one of the cluster nodes;

FIG. 6-A illustrates a scenario in which two cluster nodes are involved in backing-up data from a virtual volume to a virtual backup device, and the data in the virtual volume and the backup device can be locally accessed from one of the cluster nodes;

FIG. 6-B illustrates a scenario in which one cluster node is involved in backing up data from a virtual volume to a virtual backup device;

DETAILED DESCRIPTION

Figure 1:
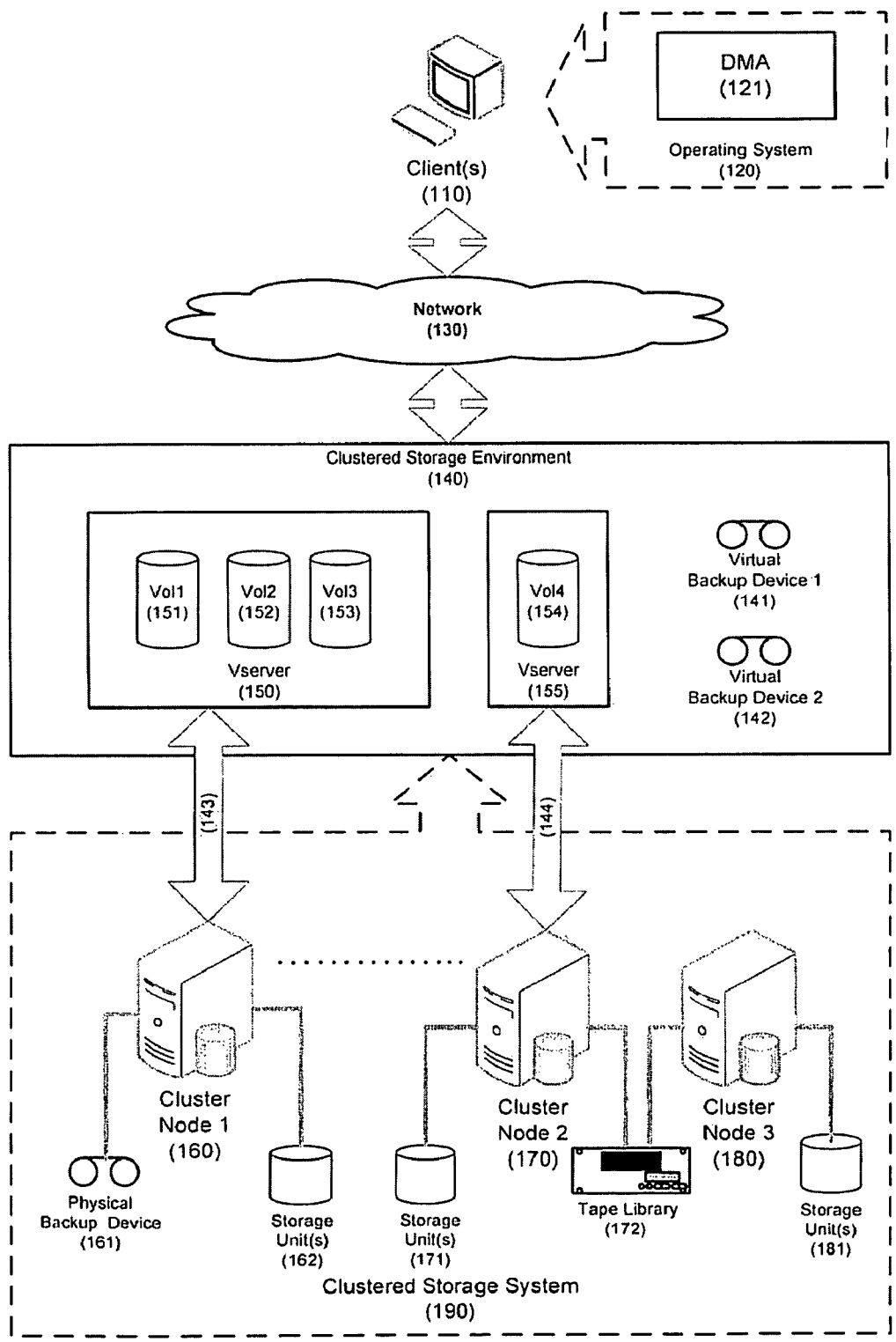
FIG. 1 illustrates a network storage environment in which the present invention can be implemented.

A method and apparatus for implementing a single system configuration to backup and restore a clustered storage system are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment, nor are they necessarily mutually exclusive.

To minimize the impact to a DMA and data redundancy policies when a physical configuration of a storage system is changed, the data redundancy policies can be configured based on logical storage entities, instead of physical storage entities. The logical storage entities are located in a logical storage environment, which shields the physical configurations of these logical storage entities from the DMA. For a clustered storage system that is formed by multiple storage servers, the logical storage environment is a clustered storage environment implemented on top of, or as a part of, a clustered operating system. Thus, the logical storage environment is a single-system logical configuration that can be presented to the DMA, allowing the DMA to access and manage the clustered storage system. Multiple types of logical storage entities, such as virtual servers, virtual volumes, and virtual backup devices, etc., can be further defined in the clustered storage environment to represent the storage capacities provided by the clustered storage system. Thus, the DMA and its data redundancy policies can utilize these logical storage entities instead, without being impacted by data movements or structural changes occurring in the clustered storage system.

Storage for the logical storage entities can be supplied by a physical storage system. The physical storage system can be a clustered storage system implemented with multiple storage servers, each of which acts as a cluster node. The multiple storage servers are interconnected to allow one cluster node to access any other cluster node via a cluster switching fabric. A clustered operating system can then be implemented on any or all of the cluster nodes to create a logical single system view of the clustered storage system. On the top of, or as a part of, the clustered operating system, a clustered storage environment forms the foundation for the logical storage entities contained therein. Thus, by communicating with a single cluster node, a client system can logically manage and control all logical storage entities in the clustered storage environment, as well as physically access all the cluster nodes. The logical storage entities can then be provided to client systems for storage access. In addition, a DMA can perform a single-system configuration of backing-up and restoring of the clustered storage system based on these logical storage entities.

In one embodiment, the logical storage entities include virtual servers (vservers), virtual volumes, virtual backup devices, etc. A vserver is a logical storage entity that acts as a physical storage server, and can be configured with an IP address that is mapped to the IP address of a cluster node. During operations, client requests sent to a vserver's IP address are routed to the mapped cluster node. The mapped cluster node, which is implemented with the clustered storage environment and has access to all the other cluster nodes in the clustered storage system, can process the client requests for the vserver. When the cluster node is replaced with another cluster node during failover, the IP address for the vserver is not changed, but mapped to the IP address of the replacement cluster node. Thus, a vserver shields the physical characteristics which can impact a data redundancy policy during cluster node failover. A DMA running on a client system can still issue backup/restore operations to the vserver, despite the fact that the commands might be routed to a different cluster node.

In one embodiment, a vserver can contain one or more virtual volumes each of which can be flexibly configured and resized in the vserver. The virtual volume resembles conventional storage entities provided by a physical storage server. The storage for a virtual volume can be provided by one cluster node, or can be stripe-distributed or replicated among multiple cluster nodes. Further, data storage for a virtual volume can be physically moved from one cluster node to another cluster node without changing the virtual volume's configurations. To access a virtual volume's storage, the clustered storage environment that implements the virtual volume dynamically locates the virtual volume's data, which might be distributed or changed among multiple cluster nodes. Thus, a DMA is shielded from the physical implementations of the virtual volumes, thereby ensuring that the data redundancy policies will not be impacted by any changes in data storage in the clustered storage system.

In one embodiment, physical backup devices, which are often locally connected to the individual cluster nodes and accessible only via these nodes, can be configured as virtual backup devices available throughout the clustered storage environment. Thus, data stored in the vservers and virtual volumes can be backed-up to, or restored from, the virtual backup devices without being restricted by the physical connections between the cluster nodes and the physical backup devices. By communicating with the clustered storage environment, a DMA can obtain an overview of the various logical storage entities and the available virtual backup devices for setting up data redundancy policies. The clustered storage environment is then responsible for locating the physical backup device that is associated with the virtual backup device. Therefore, the data redundancy policies are not limited by the availability and the connectivity of a single physical backup device.

In one embodiment, to further reduce changes to the logical storage entities that can impact the data redundancy policies, the logical storage entities, including vserver, virtual volume, and virtual backup device, are given unique namespace paths for identification; and, the namespace paths for all the storage entities are grouped into a global namespace structure available to the clients of the clustered storage environment. The global namespace structure also preserves the hierarchical relationships among these entities. Thus, even if a vserver or a virtual volume is moved or updated, as long as its namespace path is not altered, the logical storage entity can always be easily identified by its namespace path for backup or restore operations. The clustered storage environment would be responsible for dynamically locating the data from the moved or updated storage entity during the backup/restore processes.

Network Data Management Protocol (NDMP) is an industrial open standard protocol for enterprise-wide backup of heterogeneous network-attached storage. In one embodiment, the DMA issues NDMP commands to the clustered storage environment to backup data stored in a virtual volume or a vserver to a particular virtual backup device. The cluster node that received the NDMP commands identifies the cluster nodes that store the data to be backed-up, and the cluster node that has access to the physical backup device corresponding to the virtual backup device. Each of the cluster nodes contains a data server and a backup engine. The data server is responsible for locating the data and the physical backup device, as well as controlling the backup engines of the involved cluster nodes. The backup engine performs data retrieving, data transmitting, and backup device control. When the data server determines that the data and the physical backup device are located at different cluster nodes, the data server can communicate with the backup engines of these cluster nodes for the transmitting of data to the backup device. Alternatively, if the data server determines that the data and the backup device are located at the same cluster node, then data can be transmitted directly from that cluster node to its locally attached backup device.

In one embodiment, the DMA can issue NDMP commands to restore data from a logical backup device to a particular logical storage entity. The data server of the cluster node that received the NDMP commands can determines whether the storage entity to be restored exists in the clustered storage environment. If the storage entity does not exist, the data server can create the storage entity with the configurations that are included in the NDMP commands before initiating the restoration process. During restoration, the data server also performs similar operations as in the backup process to identify the cluster nodes for storing the data and the cluster node that has local access to the physical backup device. Afterward, data can be either externally transmitted from the physical backup device of one cluster node to another cluster node, or internally transmitted from the backup device to the storage of the same cluster node that has local access to the backup device.

Refer now to FIG. 1, which shows a network storage environment in which the present invention can be implemented. In FIG. 1, a clustered storage environment 140 provides data storage services to one or more clients 110 via a network 130. A client 110 may be, for example, a conventional personal computer (PC), server-class computer, workstation, handheld computing or communication device, or the like. The network 130 may be, for example, a local area network (LAN), wide area network (WAN), metropolitan area network (MAN), global area network such as the Internet, a Fibre Channel fabric, or any combination of such interconnects. The clustered storage environment 140 allows storage capacities provided by a clustered storage system 190 to be logically presented. Thus, the clustered storage environment 140 shields the physical implementations of the clustered storage system 190 and its components from the clients 110. By interacting with the clustered storage environment 140, the clients 110 can view, access, and manage the clustered storage system 190 as a single system, rather than individually communicating with each of the storage servers 160, 170 or 180.

In one embodiment, the clustered storage system 190 is formed by a cluster of cooperating storage servers 160, 170 and 180. Once integrated into the clustered storage system 190, each of the storage servers 160, 170 and 180 can be commonly referred to as a cluster node, a storage node, or a node in a cluster. The storage server that forms a cluster node can be a file-level storage server such as used in a NAS environment, a block-level storage server such as used in a SAN environment, or a storage server which is capable of providing both file-level and block-level service. Even though clients 110 appear to communicate directly with the clustered storage environment 140, the various read and write requests sent from the clients 110 are in fact transmitted to the clustered storage system 190 and directed to data stored in or to be stored in the cluster nodes 160, 170 or 180. The clustered nodes 160, 170 and 180 are also connected with their respective storage units 162, 171 and 181. Theses storage units can include, for example, conventional magnetic or optical disks or tape drives; alternatively, they can include non-volatile solid-state memory, such as flash memory, etc., or other types of storage devices.

In one embodiment, after becoming a part of a cluster, each cluster node can communicate with the other cluster nodes, and can access the storage components within these other cluster nodes. Furthermore, each cluster node in a clustered storage system 190 can have the same or different storage capacities, and can have common or unique configurations. For example, in FIG. 1, the cluster node 160 has a locally-connected physical backup device 161 that can be used for data backup and/or restoration. The backup device 161 is a data storage device that can read and write data stored on a tape (e.g., magnetic, etc) or an optical (e.g., CD, DVD, etc) medium. The backup device 161 can be connected to the cluster node 160 via a SCSI, Fibre Channel, Parallel Port, IDE, SATA, USB, FireWire, or other interconnects. The term "locally-connected" means that once connected to the cluster node 160, the backup device 161 can only be accessed through the cluster node 160, regardless of whether the backup device 161 has network communication capability or not.

In one embodiment, the cluster nodes 170 and 180 share access to a tape library 172, which can be a storage device containing tape drivers, slots to hold tape cartridges, bar code readers, and/or loading mechanisms for organizing and manipulating multiple tape cartridges. Since many tape libraries can support data transmission from multiple storage servers, the tape library is often an ideal solution for archiving a large amount of data for a clustered storage system 190. The tape library 172 is usually connected to multiple cluster nodes 170 and 180 via a network switch (not shown). Thus, either one of the cluster nodes 170 and 180 can access the tape library 172 for backup/restore operations. Alternatively, other types of storage devices, such as virtual tape libraries, or additional storage servers with storage capacities, can also act as local or shared backup devices for the clustered storage system 190.

In one embodiment, a clustered operating system (COS), which is not shown in FIG. 1, can be loaded and operational in one or each of the cluster nodes 160, 170 and 180. The clustered storage environment 140 can then be configured on the top of, or as a part of, the COS. To allow access of the COS as well as the clustered storage environment 140 from any one of the cluster nodes instead of from a single dedicated node, the configuration information from one cluster node can be replicated to the rest of the cluster nodes. Likewise, when the configuration for a clustered storage environment 140 is changed at one cluster node, the updated configuration is also propagated to the rest of cluster nodes to provide a synchronized view of the clustered storage environment 140. Thus, when a client 110 communicates with any one of the cluster nodes 160, 170 and 180, the COS running on that node presents the clustered storage environment 140 and avails the storage capacities from all the cluster nodes to such client 110. The COS also allows easy addition or removal of the cluster nodes from the clustered storage system 190 without affecting a client 110's ability to access the clustered storage environment 140. Thus, from the perspectives of a client 110, the clustered storage environment 140 acts as a single storage system in providing data storage services, including data backup and restoration.

In one embodiment, a clustered storage environment 140 logically supplies the storage capacities provided by the clustered storage system 190 through various types of logical storage entity. For example, a virtual storage server (vserver) is a logical storage entity that acts as a conventional physical storage server from the perspective of a client 110. To allow a vserver being directly accessed by the client 110 in a similar fashion as accessing a physical storage server, the vserver can be configured with an IP address that is mapped to an IP address of a cluster node. In FIG. 1's example, the IP address for the vserver 150 can be mapped via a mapping 143 to the cluster node 160, and the IP address for the vserver 155 can be mapped via a mapping 144 to the cluster node 170. The mappings 143 and 144 allow network communications intended for vservers to be seamlessly transmitted to the mapped cluster nodes.

In one embodiment, the mapping can be accomplished by having the same IP address for both the vserver and the mapped cluster node. For example, vserver 150 can have an identical IP address as cluster node 160. Thus, the data requests based on vserver's IP address will be transmitted by the network 130 to the cluster node 160. Alternatively, the IP address for the vserver 150 can be converted to a different IP address for the cluster node 160. IP address conversion allows the mapping 143 to be dynamically changed without the client 110's awareness. When a cluster node in the storage system 190 fails-over to a replacement node, IP address conversion can be accomplished by network routing mechanisms to associate the IP address of the vserver with the new IP address of the replacement node. Thus, the client 110's network messages, which can continuously be sent to the vserver's IP address, will be routed to the replacement node's IP address. And the data redundancy policies based on the vserver remain functional even when the underlying cluster nodes for the vserver are moved or replaced.

In one embodiment, a clustered storage environment 140 contains multiple vservers each of which stores a different file system. For example, a vserver 150 can be configured for storing a MICROSOFT® WINDOWS® file system for a WINDOWS client, and another vserver 155 can contain a UNIX® file system to be used by a UNIX client. Alternatively, the vserver 150 can provide a Network File System (NFS) or a Common Internet File System (CIFS) to be used by clients. Thus, the clustered storage environment 140 has the flexibility of providing multiple storage servers, each of which is represented by a vserver with a unique IP address. Further, a cluster server (cserver), which is a special vserver, can cover the entire clustered storage environment 140. The cserver allows the clustered storage environment 140 to be managed as a single entity, regardless of the number of vservers configured in the environment 140. For example, through the cserver entity, all other logical storage entities, including vservers and virtual volumes, can be backed-up or restored as a single system. In addition, all resources contained in the storage environment 140 can also be viewed or configured through the cserver entity.

In one embodiment, a virtual volume is another type of logical storage entity that shields its physical implementation from the clients 110. Similar to a vserver, a virtual volume can be configured to look and act the same as a storage entities provided by a physical storage server. For example, a virtual volume can be configured as a LUN (Logical Unit Number) or a conventional storage volume of a physical storage server. The virtual volume can then communicate in any of the various LUN protocols, such as SCSI, Fibre Channel Protocol (FCP), iSCSI, or a HyperSCSI protocol, etc. The virtual volume can also implement all the functionalities supported by a conventional storage volume of a storage server. Once configured, a virtual volume can be assigned to a specific vserver, dynamically resized, and/or moved among vservers in the clustered storage environment 140. Thus, the vserver and its virtual volumes form a hierarchical storage structure that can meet the client 110's various storage needs, in the meantime shielding their physical implementations from the client 110.

In one embodiment, one of the cluster nodes provides storage to a virtual volume. Alternatively, storage capacity in a virtual volume can be supplied by multiple cluster nodes in a stripe-distributed fashion. In this case, a piece of logically sequential data (e.g., a file) stored in a virtual volume can be divided into multiple segments, and the segments can be evenly distributed among the cluster nodes. When a client 110 requests for data stored in a virtual volume, the clustered storage environment 140 as well as its underlying COS can locate the cluster nodes the segments are stored in, load the segments from these cluster nodes, and reconstruct the requested data from these segments before returning the data to the client 110. In addition, the data stored in a virtual volume can be replicated to multiple cluster nodes. Replication spreads the loads of a virtual volume across multiple cluster nodes. For example, a data segment can be loaded from any one of the cluster nodes that contain a copy of the segment, thereby reducing the load on any single cluster node. Further, replication can also be used for data redundancy and data recovery if one of the cluster nodes 160, 170 or 180 becomes inoperable. By utilizing striping, replication, and the combination thereof, data storage for a virtual volume can be optimally distributed in ways that can take advantage of the load-balance and failover capabilities provided by the clustered storage system 190.

In FIG. 1's example, a vserver 150 is configured with three virtual volumes: vol1 151, vol2 152 and vol3 153; and a vserver 155 contains one virtual volume vol4 154. The storage space in each of the virtual volumes is provided by one or more of the cluster nodes 160, 170 and/or 180. Once configured, the vservers 150 and 155, as well as their corresponding volumes 151, 152, 153 and 154 can be exposed to the clients 110 and become visible for a DMA running on the clients 110. The clients 110 can then communicate with the vservers in the clustered storage environment 140, and mount/map the virtual volumes to the client 110's local storage entities. For example, a virtual volume can be mounted as a sub-directory under a UNIX root directory in a client 110. In a WINDOWS environment, a vserver and/or a virtual volume can be mapped and configured as WINDOWS' native storage entities, such as a drive, a WINDOWS volume, a partition, etc. Further, multiple virtual volumes can form a hierarchical storage structure with hierarchical relationships established therein. For example, a virtual volume can be configured as a sub-volume or a super-volume of another. Thus, by traversing the hierarchical relationships that exist among the logical storage entities, a user can access from one volume to another.

In one embodiment, to identify the logical storage entities defined in the clustered storage environment 140, each of the vservers and virtual volumes is assigned a unique namespace path for identification. The namespace paths for all the vservers and virtual volumes are then organized into a global namespace structure easily accessible by clients 110. A global namespace structure is an environmental-wide naming data structure that allows resources to be centrally maintained and easily retrieved. Once the global namespace structure is received from the clustered storage environment 140, a client 110 can have a single system view of the different types of storage capacities provided by the clustered storage environment 140. For example, the top level of a global namespace structure can act as a root directory of a file system. Each of the vservers can be located in the global namespace structure as a subdirectory under the root directory. Alternatively, multiple virtual volumes can have their namespace paths connected with junctions. Junctions describe the hierarchical volume relationships and can be used to link multiple volumes to a single volume. Like subdirectories under a parent directory, namespace paths for a set of sub-volumes could be similarly linked with namespace paths of a parent volume.

In one embodiment, based on the configuration as illustrated in FIG. 1, a namespace configuration table such as Table 1 below can be used to store or retrieve the global namespace structure. The namespace configuration table can be virtual volume specific. That is, for each virtual volume configured in the clustered storage environment 140, the table includes a row of information storing the unique ID of the virtual volume, the ID of its parent volume, the base server the virtual volume is assigned to, the namespace path for the volume, whether the volume is replicated or striped in the clustered storage system 190, and the cluster nodes the volume uses to store its data. Based on these rows of information in the table, an application can reconstruct the hierarchical relationships that exist among the vservers and virtual volumes.

TABLE 1

(Namespace Configuration Table)

| Virtual Volume ID | Parent Volume ID | Vserver ID | Namespace Path | Replicated | Striped | Cluster Node ID List |
|---|---|---|---|---|---|---|
| Vol1 (151) | Root | Vserver1 (150) | /user | No | No | Cluster Node 1 (160) |
| Vol2 (152) | Vol1 | Vserver1 (150) | /user/bob | No | No | Cluster Node 2 (170) |
| Vol3 (153) | Vol1 | Vserver1 (150) | /user/alice | No | No | Cluster Node 3 (180) |
| Vol4 (154) | Root | Vserver2 (155) | /foo | No | Yes | Cluster Nodes 1, 2, 3 (160, 170, 180) |

In one embodiment, the global namespace structure, as well as any derivative data structure such as the namespace configuration table, can be synchronized in the memory of the cluster node 160, 170 and/or 180, and can be updated over time to reflect the most recent configuration. Alternatively, the namespace configuration table can also be accessed and maintained by the client 110. With a single system view of the clustered storage environment 140, a DMA can configure data redundancy policies on the different logical storage entities based on the entities' respective namespace paths. In the example as illustrated in FIG. 1 and Table 1, vol1 151 can be initially located under the root volume, assigned to vserver 150, mounted to a directory/user, not replicated nor striped, and can utilizes storage capacity in cluster node 160. When vol1 151 is relocated to parent volume Vol1 moved to vserver 2 155, or being replicated or striped to different cluster nodes, as long as the namespace path for the Vol1 is not changed, a client 110 can continue to access Vol 151 by using its namespace path, without aware of the above changes that can occur throughout the time. Thus, the namespace path and the global namespace structure further shield the physical characteristics of the vservers and virtual volumes from the client 110, thereby allowing the client 110 to easily identify and use the storage entities in the clustered storage environment 140.

In one embodiment, the backup device 161, which is locally-connected to the cluster node 160, and the tape library 172, which is a local resource for the cluster nodes 170 and 180, can be configured in the clustered storage environment 140 as virtual backup devices. A virtual backup device is an environmental-wide resource that can be visible throughout the clustered storage environment 140, and can be utilized by vservers and/or virtual volumes without being limited by the physical connectivity existed between the physical backup device/tape library and the cluster nodes. For example, in FIG. 1, the physical backup device 161 can be configured as a cluster-wide virtual backup device 141, and the physical tape library 172 can be configured as a cluster-wide virtual backup device 142. Thus, the clients 110 can access the logical backup devices 141 and 142 as if these two backup devices are components of the clustered storage environment 140.

In one embodiment, based on the backup devices illustrated in FIG. 1, a backup device configuration table, such as the Table 2 below, can be maintained to record the physical characteristics and connectivities of these physical backup devices in associate with the virtual backup devices.

TABLE 2

(Backup Device Configuration Table)

| Virtual Backup Devices | Physical Backup Device | Visible Cluster Node(s) |
|---|---|---|
| Backup Device 1 (141) | Physical Backup Device 161 | Cluster Node 1 (160) |
| Backup Device 2 (142) | Tape Library 172 | Cluster Node 2 (170); Cluster Node 3 (180) |

In Table 2, each virtual backup device can be identified with a cluster-wide namespace path such as "Backup Device 1." The backup device configuration table can then be maintained and synchronized in one or each of the cluster nodes, thereby allowing a client to view the table when accessing a cluster node. Information in the table can then be utilized to locate the physical backup devices, and to find a path to transmit data from or to the physical backup devices. Thus, data redundancy policies that are defined based on the vservers, the virtual volumes, and the virtual backup devices are no longer restricted by the location of the data in association with the cluster nodes and the physical backup devices.

In one embodiment, the client 110 contains a data management application (DMA) 121 for monitoring and managing the storage data provided by the clustered storage environment 140. Implemented on the top of an operating system 120 running in the client 110, the DMA 121 can access the storage entities exposed by the clustered storage environment 140. The DMA 121 is also responsible for creating and managing data redundancy policies in order to preserve the data stored in the clustered storage system 190. In one embodiment, the DMA 121 sends and receives backup/restore instructions to the clustered storage environment 140 in NDMP protocol. Note that the DMA 121 can also utilize other standard or proprietary protocols in managing the backing-up and restoring of the storage entities in the clustered storage environment 140. The details about NDMP communications between the DMA 121 and the clustered storage environment 140 are further described below.

In one embodiment, the clustered storage environment 140 provides a single system configuration for clustered system backup and restore. Upon receiving commands from a client 110, the clustered storage environment 140 locates the storage entities that are identified by the namespace paths, and the virtual backup device for the backup/restore operations. The clustered storage environment 140 traces the clustered nodes 160, 170 and/or 180 that are used by the storage entities. The clustered storage environment 140 also ascertains the best data transfer approach for transmitting data between the cluster nodes and the backup devices. Further, the clustered storage environment 140 ensures that data redundancy policies will not be stall upon a change of the cluster nodes and/or the backup devices in the clustered storage system 190.

Figure 2:
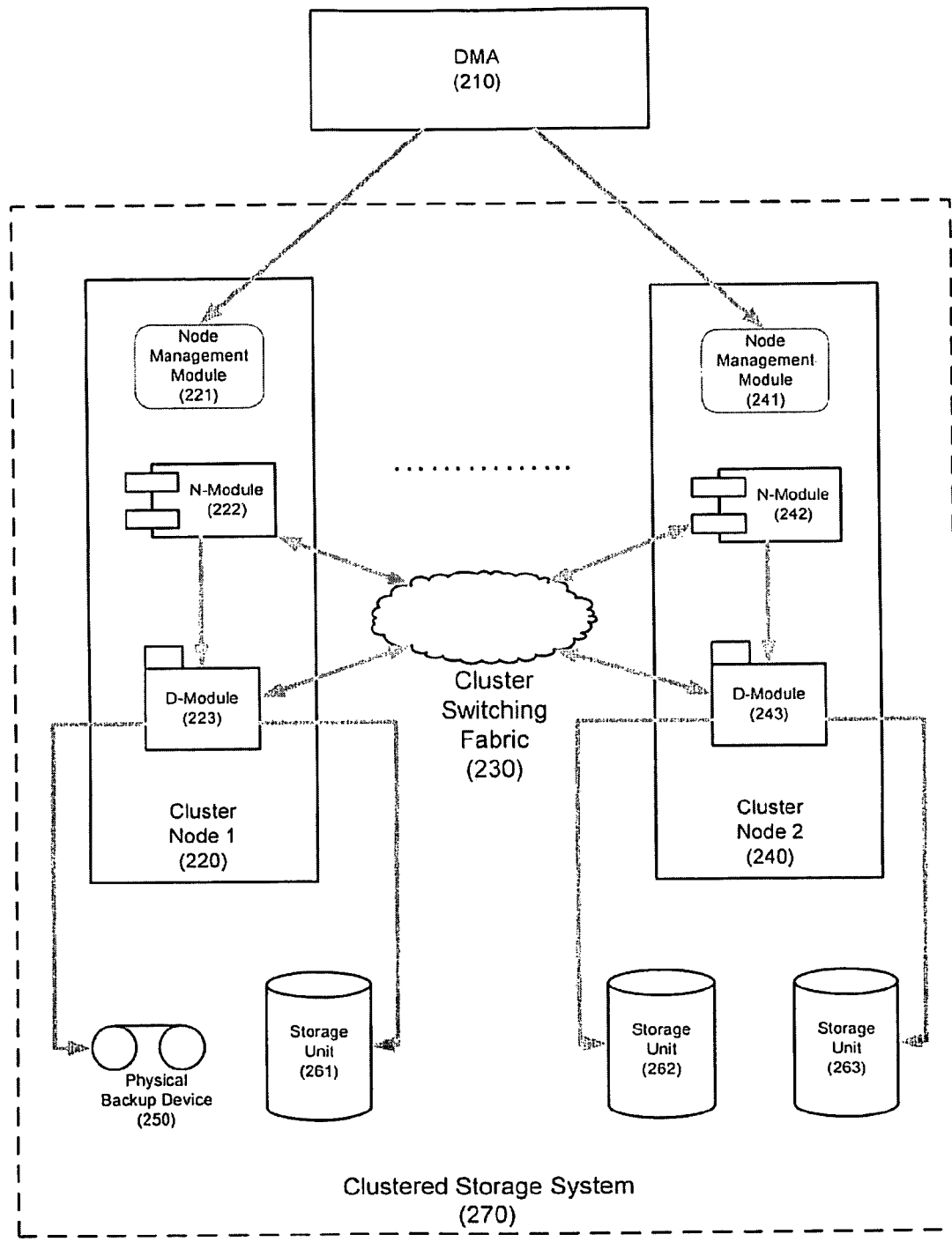
FIG. 2 illustrates an implementation of a clustered storage system.

FIG. 2 illustrates an implementation of a clustered storage system 270, in accordance with certain embodiments of the present invention. In FIG. 2, two cluster nodes 220 and 240 are interconnected to form a physical clustered storage system 270, which can be configured to provide a logical clustered storage environment 140 of FIG. 1. Each of the cluster nodes 220 and 240 includes various physical components that are operative to implement a distributed storage system. Additional storage nodes can be included or added to the clustered storage system 270. A cluster node can also be replaced or removed from the clustered storage system 270. To facilitate communications among the cluster nodes, each node is generally organized with an N-module such as N-module 221, and a D-module such as D-module 222. An N-module includes functionalities that enable the node to connect to clients over a network, while the D-module connects to one or more of storage devices such as storage unit 260 or tape drive 250. The N-module acts as a front-end of the storage node, exporting services to clients; the D-module acts as the back-end, managing the underlying storage of the storage server. The N-module and D-module can be contained in separate housings and communicate with each other via network connections. Thus, the N-module and the D-module enable a storage server to be physically separated and distributed across a network.

In one embodiment, the cluster nodes 220 and 240 are interconnected via a cluster switching fabric 230 in a dedicated or shared network. The cluster switching fabric 230 can be a Gigabit Ethernet switch connecting the N-modules and D-modules of all the cluster nodes. Through the cluster switching fabric 230, each N-module in a cluster node can not only communicate with the D-module in the same cluster node, but also with the N-modules and D-modules of all the other cluster nodes. Likewise, a D-module in a cluster node can also communicate with the D-modules located in the other cluster nodes. Although in FIG. 2 there are equal numbers of N-modules and D-modules, each cluster node can have multiple N-modules and/or multiple D-modules. Thus, the N-modules and D-modules connect multiple storage servers into a clustered storage system 270. Alternatively, other hardware or software approaches can also be utilized to create a clustered storage system based on a number of storage servers.

In one embodiment, N-modules and the D-modules expose the storage units and backup devices selectively available to some of the cluster nodes to all the cluster nodes. Thus, a backup device 250 and a storage unit 261, which are connected to storage node 220 via a D-module 222, can not only be accessed by N-module 221 of the storage node 220, but also be accessed by N-module 241, D-module 243, and any other N-modules and D-modules that are interconnected vial the cluster switching fabric 230. Likewise, the storage units 262 and 263 can also be accessed by components in the storage node 240, as well as any N-modules or D-modules of the other nodes in the clustered storage system 270. Thus, the clustered storage system 270 allows storage data to be moved among the storage units 261, 262 and 263, as well as among the storage nodes 220 and 240, etc, without any one of the storage nodes losing access to such data. Furthermore, the clustered storage system 270 allows a locally attached system resource such as the backup device 250 to be a system-wide resource, thereby ensuring the proper utilization of the local resource by all storage nodes.

In one embodiment, the cluster nodes 220 and 240 contain node management modules 221 and 241, respectively. The node management module can be a hardware module to store and execute a cluster operating system. It can also implement a clustered storage environment and store configuration information such as namespace configuration table and backup device configuration table, etc. The above configuration information is synchronized for all the node management modules to allow access of the clustered storage environment via any one of the node management modules. By communicating with any one of the node management modules 221 and 241 via their respective N-modules, a client can have a single system view of the clustered storage environment and have access to all the cluster nodes in the clustered storage system 270.

In one embodiment, the node management module acts as a NDMP data server for a DMA client 210 executing in a client 110 of FIG. 1. Either one of the node management modules 221 and 241 can receive NDMP messages from the DMA 210, and perform NDMP operations to backup/restore data between the storage units and backup devices of the clustered storage system 270. During the backup/restore operations, the node management module, N-module, and/or D-module can determine which cluster node(s) a piece of data is located, and also ascertain the cluster node(s) that have local access to the specific backup device. After the backup/restore source and destination are determined, the node management module can also instruct the N-modules and the D-modules of the cluster nodes that are involved, in order to transmit data among the cluster nodes and perform the backup/restore operations. The details about the NDMP communications and the backup/restore operations are further described below.

Figure 3:
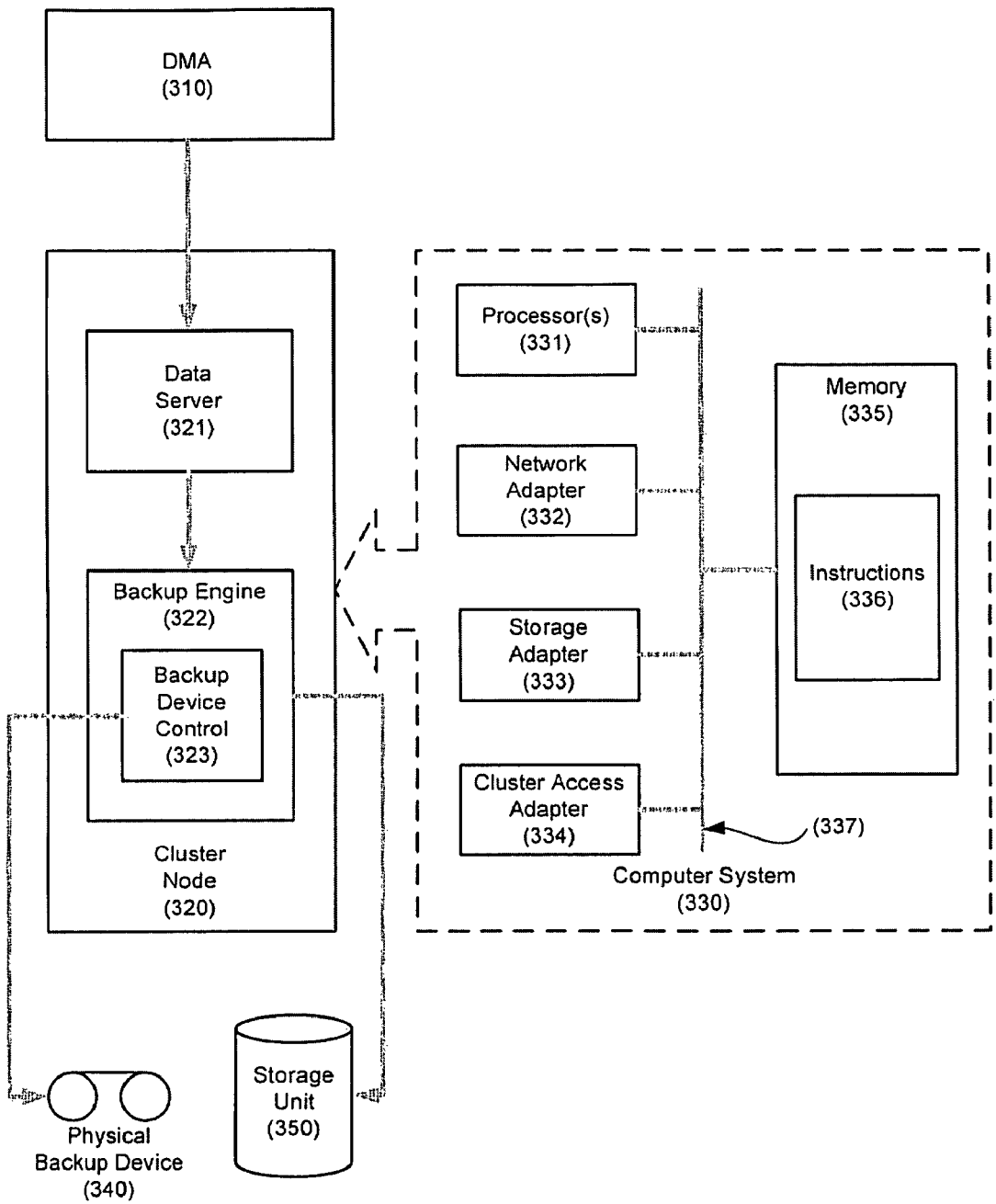
FIG. 3 illustrates an implementation of a cluster node in a clustered storage system.

FIG. 3 illustrates an implementation of a cluster node in a clustered storage system, in accordance with certain embodiments of the present invention. In FIG. 3, a storage server 320 is configured as one of the cluster nodes that form a clustered storage system. After configuration, the storage server 320 can be referred to as the storage node 320. The storage node 320 can be originally configured as a part of cluster, or later added into an already-in-existence cluster. In one embodiment, the storage node 320 contains a data server 321 and a backup engine 322 that are executed on the top of, or as a part of a COS. Together the data server 321 and the backup engine 322 can create a clustered storage environment for a DMA client 310. The data server 321 can be implemented in a node management module 221 of FIG. 2, and the backup engine 322 can be implemented in a D-module 223 of FIG. 2. Alternatively, the data server 321 and the backup engine 322 can be combined or separately implemented in node management module, N-module, D-module, or any other suitable logical or physical modules contained in a cluster node. In one embodiment, the data server 321 receives NDMP messages from a DMA client 310, to perform operations such as backing up data from a virtual volume to a virtual backup device. The data server 321 and the backup engine 322 also perform the functions that provide a single system configuration for backing-up and restoring a clustered storage system.

In one embodiment, the backup engine 322 controls and manages data backup from a storage unit 350 to a physical backup device 340, or data restoring from the physical backup device 340 to the storage unit 350. Note that the backup device 340 and the storage unit 350 can be internal or external to the cluster node 320 in which the backup engine 322 is located, or the backup device 340 and the storage unit 350 can be connected to different cluster nodes. In one embodiment, the backup engine 322 can utilize some of the backup/restore utilities that are provided by an underlying COS running on the storage node 320. For example, a UNIX operating system may provide backup/restore tools such as dump, tar, cpio, dd, and restore, etc. Once storage data and the backup device are ascertained by the data server 321, the backup engine 322 may initiate such tools to actually perform the backup and restore actions. In one embodiment, the backup engine 322 contains a backup device control 323 that can be used to interact with a locally attached backup device such as backup device 340. The backup device control 323 can also receive direct instructions from backup engines of other cluster nodes in performing data transmission from/to the backup device 340. Alternatively, if the storage node 320 does not have a backup device 340 locally attached, then the data server 321 can interact with a backup device control 323 of another cluster node that has a local access to a backup device.

In one embodiment, the backup engine 322 acts as a data locator, data transmitter and/or data receiver, in controlling and managing of the data backup and restore. During data backup, if the data server 321 determines that data to be backed up is located in the storage unit 350, the backup engine 322 is responsible to load such data from the storage unit 350. If the backup device 340 is not locally accessible from the cluster node 320 but from another specific cluster node, the backup engine 322 may initiate communication with the backup engine of that specific node, and subsequently transmits data stored in the storage unit 350 to the specific node. Likewise, the backup engine 322 and/or its backup device control 323 may communicate with a backup engine of another node to receive data from such node. During data restoration, the above processes are reversed. Thus, the backup engine may transmit data from its local backup device 340, or act as a data receiver to restore data received from another node to its storage unit 350. Details about the backup and restoring processes are further described below.

In one embodiment, the storage node 320 can be implemented with a general or special purpose computer system 330. The computer system 330 includes one or more processors 331, memory 335, a network adapter 332, a storage adapter 333, a cluster access adapter 334, and other components (e.g., N-module, D-module, etc) interconnected by a system bus 337. The processor(s) 331 may include central processing units (CPUs) that control the overall operation of the storage server 330. In certain embodiments, the processor(s) 331 accomplish this by executing software or firmware stored in memory 335. The processor(s) 331 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The memory 335 is or includes the main memory of the computer system 140. The memory 142 represents any form of random access memory (RAM), read-only memory (ROM), flash memory (as discussed below), or the like, or a combination of such devices. In use, the memory 335 may contain, among other things, a set of machine instructions 336 which, when executed by processor 141, causes the processor 331 to perform operations to implement embodiments of the present invention. Further, each of the node management module, N-module, and/or D-module of the cluster node can contain their own processor(s) and/or memory.

In one embodiment, the network adapter contains one or more ports to allow the storage node 320 to communicate with external systems, such as a DMA client 310, over a network. Through the network adapter 332, the storage node 320 can communicate with the external systems by exchanging frames or packets of data according to standard or proprietary network communication protocols such as TCP/IP, etc. The storage adapter 333 can be connected to or be a part of a D-module, and be used by the COS or the backup engine of the storage node 320 to access data stored in storage units 350. Furthermore, other types of storage devices such as backup device 340, CD or DVD drives, etc, can also be accessed via the storage adapter 333. The cluster access adapter 334 contains one or more ports to allow access by the storage server 330 to a cluster switching fabric 230 of FIG. 2. In one embodiment, the cluster access adapter 334 is utilized by N-module and/or D-module of a storage node 320 to communicate with other N-modules and D-modules in a clustered storage system. It can also be apparent to those skilled in the art that the clustered access adapter 334 and the network adapter 332 can be combined into one, especially when the cluster switching fabric 230 is implemented in network 130 of FIG. 1.

Figure 4:
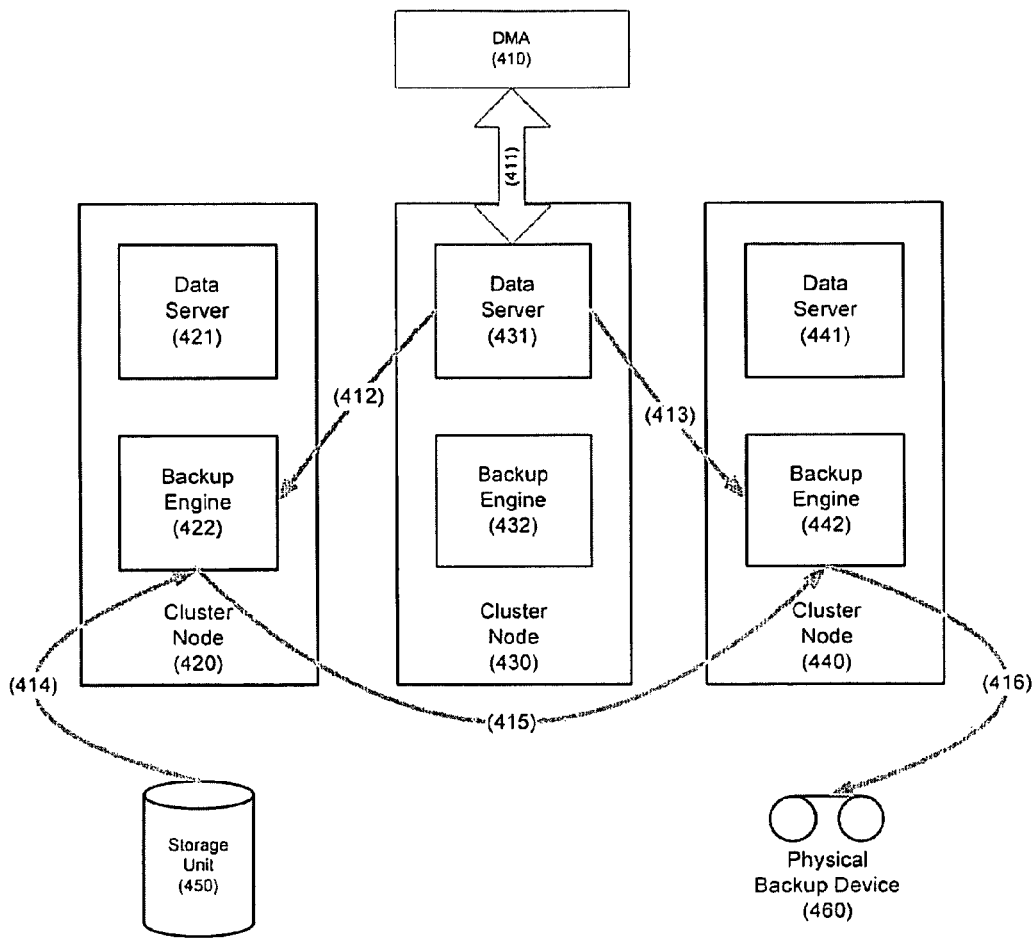
FIG. 4 illustrates a scenario in which three cluster nodes are involved in backing-up data from a virtual volume to a virtual backup device.

FIG. 4 illustrates a scenario in which three cluster nodes are involved in backing up data from a virtual volume to a virtual backup device, in accordance with certain embodiments of the present invention. To give a DMA running on a client the perception that a clustered storage environment is a single system, the clustered storage environment encapsulates the implementation of the backup/restore operations. Thus, when data for a specific virtual volume is allocated in multiple storage nodes, or a virtual volume is moved from one node to another, the clustered storage environment needs to manage the data transmission among the different nodes, without the DMA being aware of the changes in physical configurations.

In FIG. 4, an NDMP command 411 is transmitted from a DMA client 410 to a vserver in a clustered storage environment, for backing-up data stored in a virtual volume to a virtual backup device. The NDMP command 411 can be forwarded to a node management module of a cluster node that is mapped to the vserver. The data server 431, which is implemented in the node management module, evaluates the data to be backed up, and determines the distribution of such data among the cluster nodes in the clustered storage system. In one embodiment, the data server 431 identifies that the storage unit 450 of the cluster node 420 contains the data to be backed up. Subsequently, the data server 431 determines the location of the virtual backup device provided by the NDMP command. Based on the backup device configuration table, the data server 431 identifies that the virtual backup device in the NDMP command corresponds to a physical backup device 460 which can be accessed from the cluster node 440. Thus, in this scenario, three cluster nodes are involved in the backing-up of the data.

In one embodiment, upon determination of the locations of the data and the backup device, the data server 431 transmits an instruction 412 to the backup engine 422 of the cluster node 420 for the loading of the data from the storage unit 450, and transmits an instruction 413 to the backup engine 442 for storing of the data to the backup device 460. The backup engine 422, which can be located in a D-module of the cluster node 420, is also instructed of the location of the backup device 460. Thus, the backup engine 422 loads the requested data from the storage unit 450 via data flow 414, and forward the data to the backup engine 442 of the cluster node 440. The data forward can be accomplished by having the D-module of the cluster node 420 communicating with the D-module of the cluster node 440 via a cluster switching fabric. In one embodiment, the backup engine 422 directly communicates with the backup device control (not shown) within the backup engine 442 of the cluster node 440. The backup device control within the backup engine 442 can then manipulate the backup device 460 to store the transmitted data to a tape in the tape drive 460.

In one embodiment, the above data flows and data transmissions are controlled by the data server 431 of the cluster node 430. The data server 431 also performs session control and other NDMP control operations to ensure the proper completion of a backup operation. During data restoration, the data server 431 performs similar operations, except instruct the backup engines 422 and 442 to reverse the sequence of the data flows 414, 415 and 416. Thus, the data can be first loaded from the tape drive 460 by the backup device control within the backup engine 442, and transmitted to the backup engine 422, and subsequently saved to the storage unit 450 by the backup engine 422.

FIG. 5-A illustrates a scenario in which two cluster nodes are involved in backing up data from a virtual volume to a virtual backup device, and the physical backup device cannot be locally accessed from one of the cluster nodes, in accordance with certain embodiments of the present invention. In FIG. 5-A's scenario, the backup device 542 is not local to the cluster node 520 that received the NDMP command 511. Upon receiving the NDMP command 511 from the NDMP client 510, the data server 521 determines the locations of the data distribution and the physical backup device. In this case, the data to be backed-up is located in the storage unit 541, which can be locally accessed from the cluster node 520, and the physical backup device 542 can be locally accessed from the cluster node 530. Thus, the data server 521 transmits a data instruction 512 to the backup engine 522 for loading of the data from the storage unit 541, and a data instruction 513 to the backup engine 532 of the cluster node 530 for setting up the backup device 542. The backup engine 522 then loads via data flow 514 the data from the storage unit 541, transmits such data via data flow 515 to the backup device control (not shown) of the backup engine 532, and the backup device control manipulates the backup device 542 for saving the data to the tape mediums.

FIG. 5-B illustrates a scenario in which two cluster nodes are involved in backing up data from a virtual volume to a virtual backup device, and the physical backup device can be locally accessed from one of the cluster nodes, in accordance with certain embodiments of the present invention. In FIG. 5-B's scenario, the backup device 582 is local to the cluster node 570 that receives the NDMP command 551. Upon receiving the NDMP command 551 from the NDMP client 550, the data server 571 determines the locations of the data distribution and the backup device. In this case, the data to be backed-up is located in the storage unit 581, which can not be locally accessed from the cluster node 570, and the backup device 582 corresponding to the virtual backup device can be locally accessed from the cluster node 570. Thus, the data server 571 transmits a data instruction 552 to the backup engine 562 for loading of the data from the storage unit 581, and a data instruction 553 to the backup engine 572 for setting up the local backup device 582. The backup engine 562 then loads via data flow 554 the data from the storage unit 581, transmits such data via data flow 555 to the backup device control (not shown) of the backup engine 572, and the backup device control saves the data to the backup device 582 via data flow 556.

Thus, in FIG. 5-A and FIG. 5-B's scenarios, either the backup device or the storage unit that contain the data to be backed-up is not local to the cluster node that receives the NDMP command. Thus, for the two cluster nodes that are involved, their backup engines communicate between each other for the transmitting of the data from one node to the other through the cluster switching fabric. For data restoration, the data flow from the storage unit to the backup device can be reversed. Hence, data can be first loaded from the backup device, then transmitted to the node that has the storage unit local, and stored into the storage unit.

FIG. 6-A illustrates a scenario in which two cluster nodes are involved in backing up data from a virtual volume to a virtual backup device, and the data in the virtual volume and the backup device can be locally accessed from one of the cluster nodes, in accordance with certain embodiments of the present invention. The physical backup device 642 associated with the virtual backup device and the storage unit 641 associated with the virtual volume are not local to the cluster node 630 that receives the NDMP command 611. Upon receiving the NDMP command 611 from the NDMP client 610, the data server 631 determines the locations of the data distribution and the backup device. In this case, the data to be backed-up is located in the storage unit 641, which can be locally accessed along with the backup device 642 from the cluster node 570. Thus, the data server 571 transmits, via the cluster switching fabric, a data instruction 612 to the backup engine 622 for loading of the data from the storage unit 641. And the backup derive control (not shown) of the backup engine 622 can setup the backup device 642. The backup engine 622 then loads via data flow 613 the data from the storage unit 641, and store the data to the backup device 642 via data flow 614. For data restoration, the above operations are substantially the same, with the data flows of 613 and 614 being reversed.

FIG. 6-B illustrates a scenario in which one cluster node is involved in backing up data from a virtual volume to a virtual backup device, in accordance with certain embodiments of the present invention. The physical backup device 672 and the storage unit 671 are local to the cluster node 660 that receives the NDMP command 651. Upon receiving the NDMP command 651 from the NDMP client 650, the data server 661 determines the locations of the data distribution and the backup device. In this case, the data to be backed-up is located in the storage unit 671, which can be locally accessed along with the backup device 672 from the cluster node 660. Thus, the data server 571 issues an internal data instruction 652 to the backup engine 662 for loading of the data from the storage unit 671. And the backup derive control (not shown) of the backup engine 662 can setup the backup device 672. The backup engine 662 then loads via data flow 653 the data from the storage unit 671, and store the data to the backup device 672 via data flow 654. Likewise, data can be restored from the tape drive 672 to the storage unit 671 via data flows that are the reverse of 654 and 653.

Thus, FIGS. 4, 5-A, 5-B, 6-A and 6-B illustrate scenarios in which data can be transparently backed-up from a virtual volume to a virtual backup device in a clustered storage environment. When a backup device is not locally connected to a specific cluster node, backing-up data from this specific cluster node to the backup device has to utilize the internal cluster network. Such backup operation is less efficient comparing to transmitting data directly from the cluster node to the local backup device. Thus, it is highly desirable to select local cluster nodes and balance the load among all cluster nodes in utilizing the backup resources. When there are concurrent backup/restore operations, the DMA should distribute the jobs among all the cluster nodes, and utilize all the backup devices that are available. Further, the granularity of a backup operation can be at the virtual volume level. Thus, when the DMA issues an NDMP instruction to backup/restore data in a vserver or a cserver, the above processes can be repeated for each virtual volume contained in the vserver or the cserver.

Figure 7:
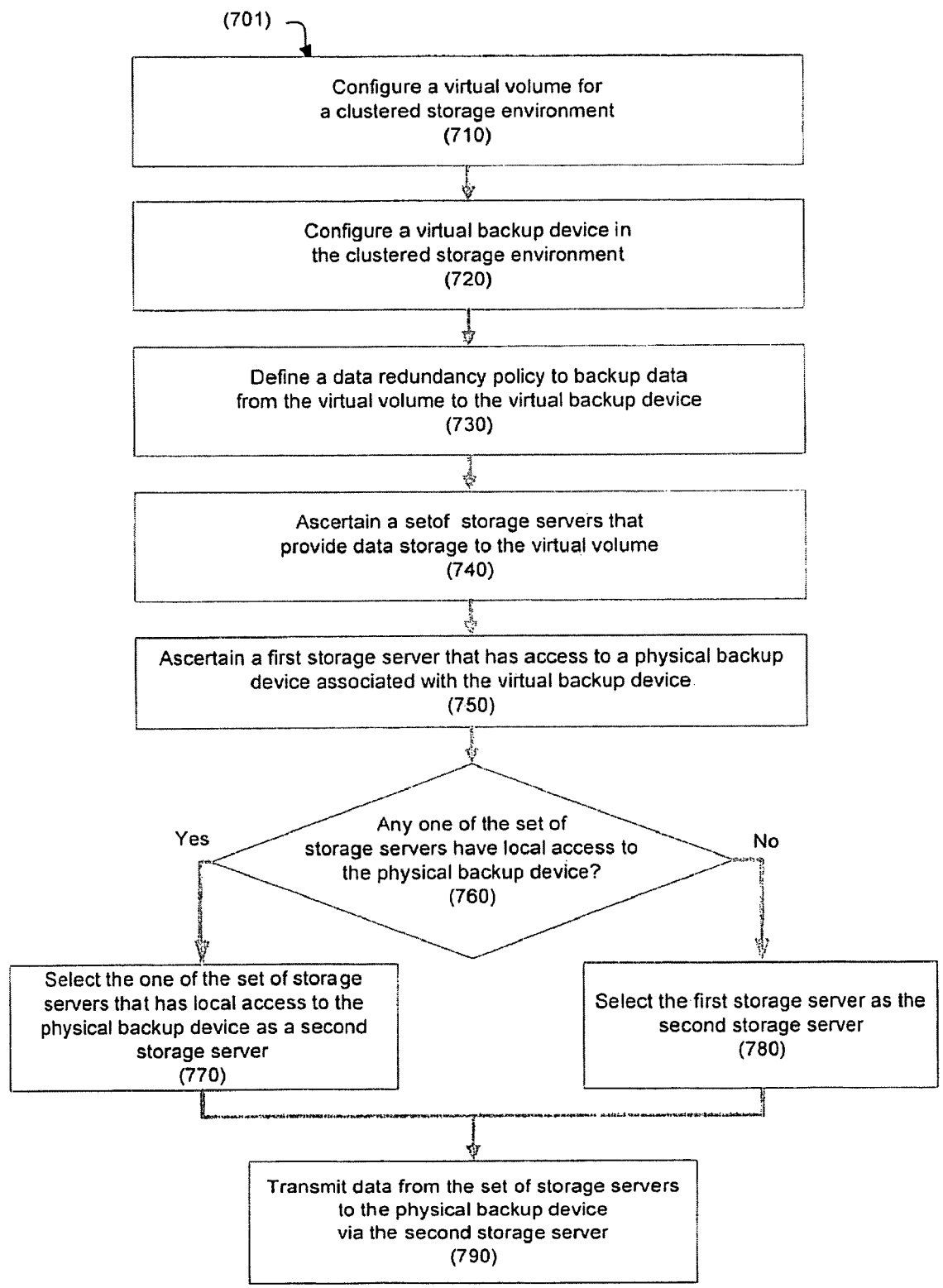
FIG. 7 illustrates a flow diagram of a process for implementing a single system configuration for backing-up a clustered storage environment.

FIG. 7 illustrates a flow diagram of a process 701 for implementing a single system configuration for backing-up a clustered storage environment, in accordance with certain embodiments of the present invention. The process 701 can be performed by processing logic that may comprise hardware (e.g., special-purpose circuitry, dedicated hardware logic, programmable hardware logic, etc.), software (such as instructions that can be executed on a processing device), firmware or a combination thereof. In one embodiment, machine-executable instructions for the process 701 can be stored in memory 335 of FIG. 3, executed by the processor 331 of FIG. 3, and/or implemented by the data server 321 and/or the backup engine 322 of FIG. 3.

Referring back to FIG. 7, at 710, a clustered storage system is created by a cluster of storage servers. Afterward, a DMA can configure a clustered storage environment based on the clustered storage system. And a virtual volume can be configured in the clustered storage environment by the DMA. The virtual volume can optionally be included in a vserver, and exposed to the client for data storage. In one embodiment, storage for the virtual volume is provided by one or more of the cluster nodes. Thus, the virtual volume is a logical volume entity that shields the physical implementation of the cluster storage system and its storage allocation. At 720, a virtual backup device, which can be based on a tape drive, a tape library, or other storage device that is locally connected to one of the clustered nodes, is also configured in the clustered storage environment by the DMA. The virtual backup device is now deemed an environment-wide resource that can potentially be used by all virtual volumes and vservers in the clustered storage environment. Also, the virtual backup device shields its physical connectivity from the client system. At 730, a data redundancy policy is defined for backing up data from the virtual volume to the virtual backup device in the clustered storage environment. The data redundancy policy can be configured by a DMA application running on a client to automate the backup and restore operations. Thus, the DMA can automatically initiate commands to start backing up data from the virtual volume to the virtual backup device based on the data redundancy policy. Alternatively, the data redundancy policy can also be used for restoring the virtual volumes from the virtual backup device.

At 740, a backup command is received by a vserver of the clustered storage environment to backup the data stored in the virtual volume to the virtual backup device. The backup command can be a NDMP command sent from a DMA client and routed to a cluster node that is mapped to the vserver. The data server of the cluster node, similar to the one in FIG. 3, is then designated to control the whole backup processed. Based on the backup command, the data server can initiate operations to ascertain a set of storage servers (cluster nodes) that provide storage to the virtual volume. In one embodiment, storage for the virtual volume is striped and distributed to multiple clustered nodes. Thus, each of these multiple clustered nodes is required for retrieving data for the virtual volume, and is added to the set of storage servers. At 750, the storage server/cluster node that has a local access to the physical backup device associated with the logical backup device is also ascertained by the data server. In one embodiment, if multiple cluster nodes share access to a backup device (e.g., a tape library), then each of these cluster nodes can be deemed having local access to the backup device. The connectivity information can be retrieved from a backup device configuration table maintained by each of the cluster nodes in the clustered storage environment.

At 760, the data server determines whether one of the set of storage servers that contain the data to be backed-up also has local access to the backup device. If two cluster nodes have local access to a tape library, and one of the cluster nodes also stores data to be backed-up, then it would be more efficient to select the cluster node that has the data as the node for accessing the tape library. This way, data would be transmitted locally from the node to the tape library, instead of being transmitted remotely from one cluster node to another before saving to the tape library. At 770, upon a determination that one of the set of storage servers that contain the data has local access to the backup device, then such storage server is selected by the data server as the second storage server to control and manage the backup device. Otherwise, at 780, any one of the storage servers that have local access to the backup device can be selected as the second storage server for managing the backup device. At 790, the data server coordinates with the backup engines of the cluster nodes that are involved for the transmitting of data from the cluster nodes to the backup device via the second storage server.

Figure 8:
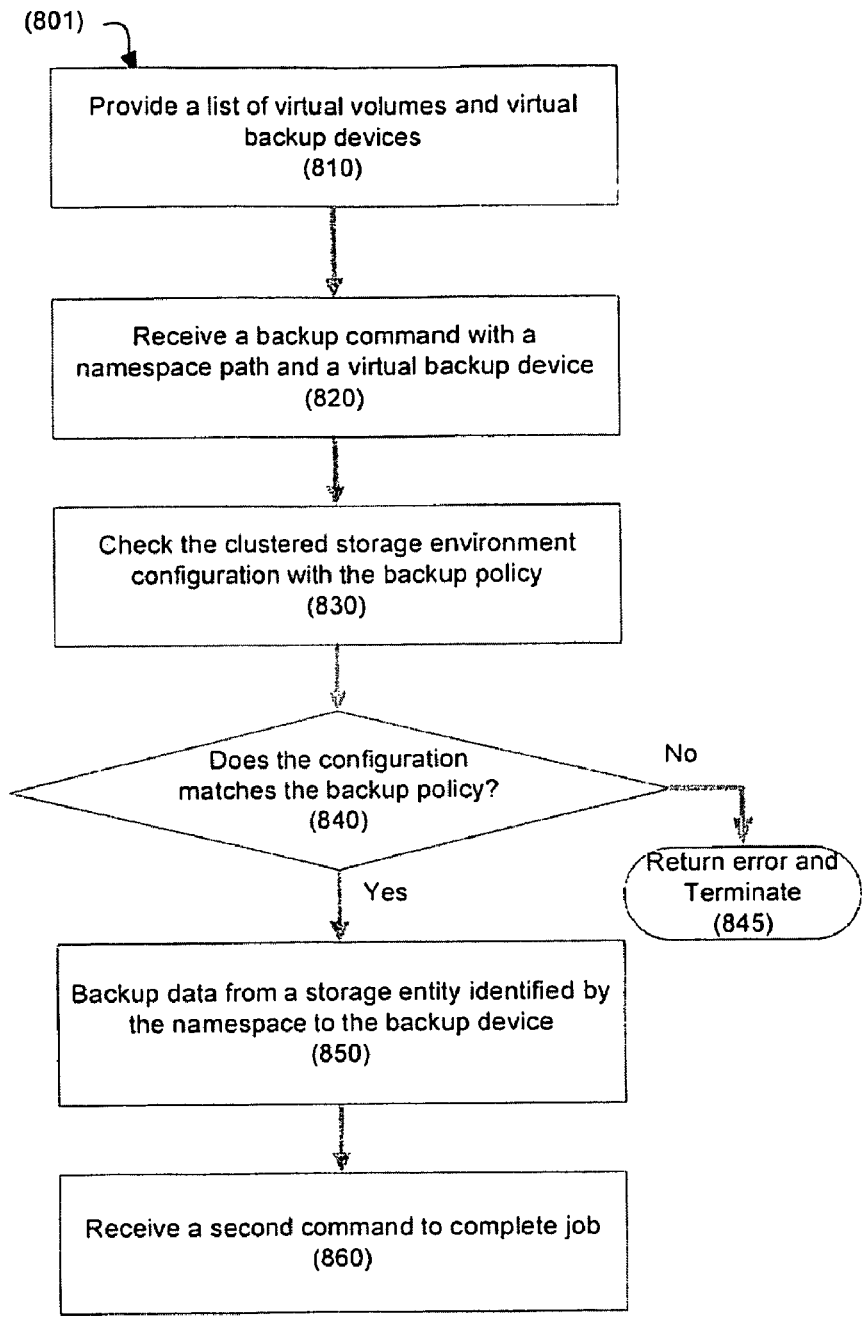
FIG. 8 illustrates a flow diagram of a process for backing up a virtual volume to a virtual backup device via NDMP commands.

FIG. 8 illustrates a flow diagram of a process 801 for backing up a virtual volume to a virtual backup device via NDMP commands, in accordance with certain embodiments of the present invention. The process 801 can be performed by processing logic that may comprise hardware (e.g., special-purpose circuitry, dedicated hardware logic, programmable hardware logic, etc.), software (such as instructions that can be executed on a processing device), firmware or a combination thereof. In one embodiment, machine-executable instructions for the process 801 can be stored in memory 335 of FIG. 3, executed by the processor 331 of FIG. 3, and/or implemented by the data server 321 or the NDMP client 310 of FIG. 3.

In one embodiment, the commands that are transmitted between a DMA and a vserver are in NDMP protocol. Alternatively, any other standard or proprietary communication protocols can also be implemented to convey messages between the DMA and the vservers. At 810, a NDMP client transmits a NDMP_CONFIG_GET_FS_INFO message to the data server of a cluster node that is mapped to the vserver. Upon receiving this NDMP message, the data server constructs a list of file system information. The file system information contains a global namespace structure of the vservers and the virtual volumes within each of the vservers. In one embodiment, the file system information further contains data stored in a namespace configure table such as the Table 1 above. The data server may alternatively transmit a NDMP_

CONFIG_GET_TAPE_INFO message to the backup engine and/or the backup device to obtain detail information about the physical backup device. The detail information, such as the identification of the physical backup device, its attribute values, and its capabilities, are also assembled by the backup engine into the return message, and returned by the data server back the DMA client.

Once the DMA receives the file system information along with backup device information from the data server, it can present to users a single system view of the clustered storage environment. The user can then define a backup policy by selecting a namespace path for a virtual volume, a vserver, or a cserver, and selecting a virtual backup device to be used for such backup. At 820, the DMA transmits a NDMP_DATA_START_BACKUP (hereinafter backup) command to the data server. The backup command contains a namespace for the specific virtual volume, vserver, or cserver, and the virtual backup device to be used to perform the data backup. In one embodiment, the backup command also contains the file system configuration information that is previously received at 810. By sending back the file system configurations, the data server can ensure that the DMA is not issuing commands based on stalled configuration information.

At 830, upon receiving the backup command with namespace path, backup device, and optionally the file system configuration information, the data server checks the current configuration of the clustered storage environment to be compared with the configuration information received from the backup command. At 840, the data server makes a determination to see whether the configurations from the DMA match the configurations of the clustered storage system. If the configurations do not match, the process 801 proceeds to 845, the data server terminates process 801, and a NDMP_INVALID_ENV_VARIABLE_ERR message can be returned by the data server to the DMA. In such a case, the DMA may issue a subsequent NDMP_DATA_GET_ENV command to the data server to retrieve the latest system configurations. Based on the received configurations, the DMA can further issue a new NDMP_DATA_START_BACKUP command to the data server, along with the latest configuration information. If the determination at 840 finds the configurations match, then process 801 proceeds to 850.

At 850, the data server starts the internal operations to backup data from the storage entity identified by the namespace path to the backup device. In one embodiment, if the namespace extracted from the NDMP_DATA_START_BACKUP command refers to a cserver, then all virtual volumes in the clustered storage environment will be backed up to the specific backup device. Alternatively, if the namespace identifies a vserver, then all virtual volumes in that vserver can be similarly backed up to the backup device. When one virtual volume is moved or updated, as long as the namespace path for the virtual volume is not changed, the data server can locate the virtual volume as well as its stored data for backup or restore operations. Therefore, the DMA's backup policy would not be affected by the physical implementation of the virtual volume. At 860, once all the vservers and virtual volumes are backed up, the DMA can issue a NDMP_DATA_STOP command to terminate the process 801. Alternatively, the DMA may terminate upon receiving messages indicating that the backup/restore operations are aborted due to error.

Figure 9:
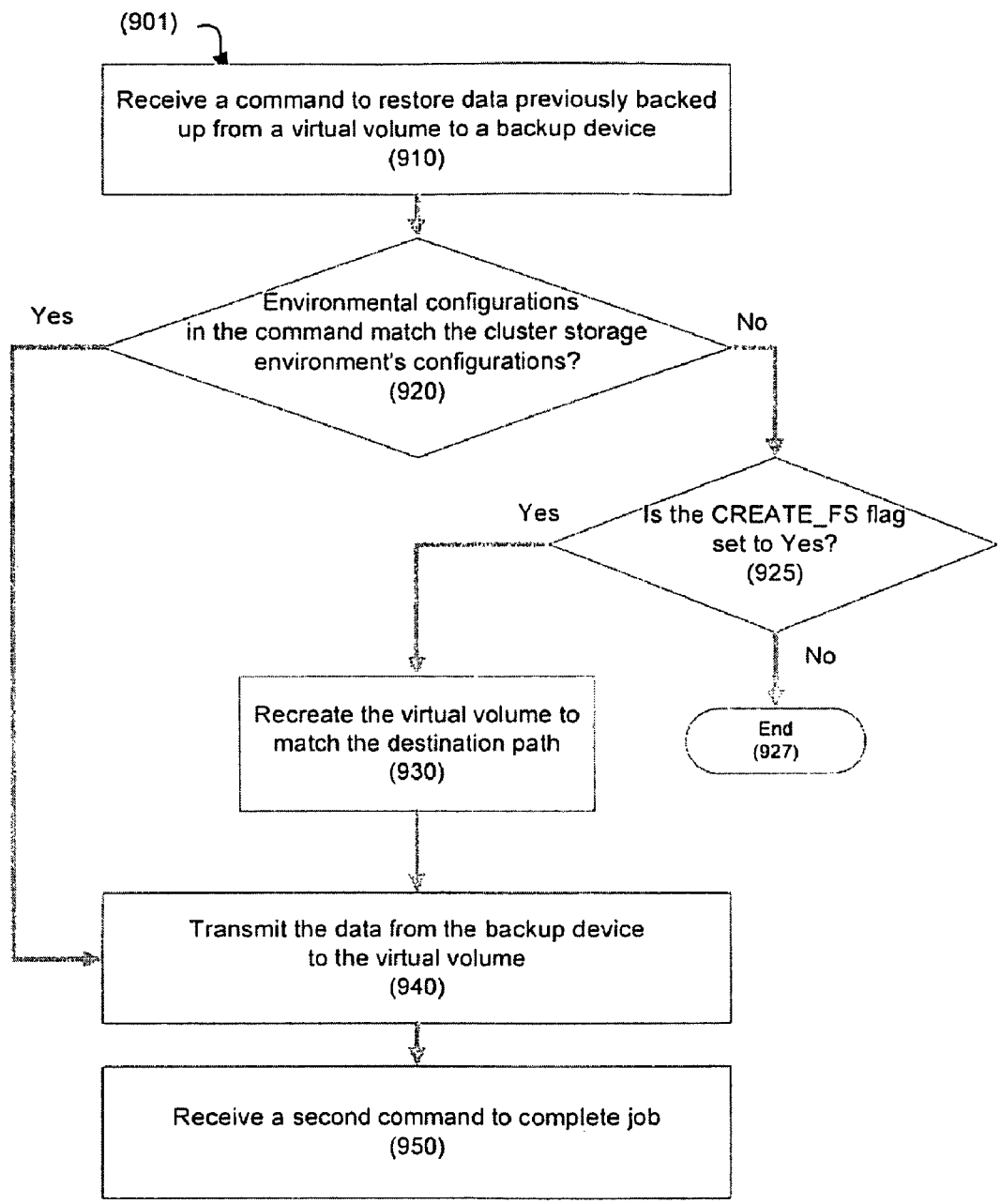
FIG. 9 illustrates a flow diagram of a process for implementing a single system configuration for restoring a clustered storage environment.

FIG. 9 illustrates a flow diagram of a process 701 for implementing a single system configuration for restoring a clustered storage environment, in accordance with certain embodiments of the present invention. The process 901 can be performed by processing logic that may comprise hardware (e.g., special-purpose circuitry, dedicated hardware logic, programmable hardware logic, etc.), software (such as instructions that can be executed on a processing device), firmware or a combination thereof. In one embodiment, machine-executable instructions for the process 901 can be stored in memory 335 of FIG. 3, executed by the processor 331 of FIG. 3, and/or implemented by the data server 321 or the backup engine 322 of FIG. 3.

At 910, a NDMP_DATA_START_RECOVER (hereinafter recovery) command is received by a data server of a cluster node to restore a namespace path from a backup device. The namespace path indicates the storage entity in the clustered storage environment for data recovery, and the backup device contains data previously backed-up. In one embodiment, if the namespace path points to a logical storage entity that may contain sub-entities, then all sub-entities underneath the particular storage entity will also be restored. For example, if a vserver contains multiple virtual volumes, then selecting the vserver for recovery also restores all the virtual volumes contained therein. Similarly, if a virtual volume is the parent of another virtual volume, then both the parent and the child virtual volumes will be restored. In one embodiment, the DMA determines the hierarchical relationships among the storage entities, and transmits the recovery commands, one command for each virtual volume, based on a top-down approach (the command for a higher level storage entity being transmitted earlier). Alternatively, the DMA can transmit the namespace path to the data server for the data server to sort out the order of data recovery.

In one embodiment, the recovery command also submits a full list of the configuration information similar to the backup command. The configuration information can also contain a WHOLE_FS flag and a CREATE_FS flag. The WHOLE_FS flag indicates whether all the data in a specific virtual volume should be restored. Thus, if the WHOLE_FS is set to Yes, then the data server performs whole volume restoration. If the WHOLE_FS flag is set to No, then the data server only performs single file restoration. In this case, the namespace path for the single file can be included in the recovery command. Further, a CREATE_FS flag indicates whether to create the specific storage entity if the namespace path received from the recovery command does not match the destination path in the clustered storage environment.

In one embodiment, the data server determines at 920 that the namespace path in the recovery command does not match the destination path in the clustered storage environment, the process 901 proceeds to 925. If the flag CREATE_FS is set to No, then the data server returns error message NDMP_INVALID_PATHNAME_ERR, and the process 901 terminates at 927. If the flag CREATE_FS is set to Yes, then the data server tries to recreate the hierarchical storage entity based on the configuration information sent from the DMA. During recreation, the data server can rebuild new virtual volumes and vservers, and assigns the namespace paths received from the DMA to these new storage entities. Afterward, the process 901 proceeds to 940. Similarly, if the determination at 920 returns Yes, then process 901 also proceeds to 940. At 940, data stored in the backup device is transmitted to the virtual volume/vservers. Upon completion of all restoration, the process 901 proceeds to 950 to complete the jobs. Alternatively, a second command can be received from the DMA to abort the recovery process due to errors.

Thus, methods and systems for a single system configuration to backup and restore a clustered storage system have been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software and/or firmware to implement the techniques introduced here may be stored on a machine-readable storage medium and may be executed by one or more general-purpose or special-purpose programmable microprocessors. A "machine-readable storage medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   interconnecting a plurality of storage servers in a clustered storage system, wherein a physical backup device is physically connected with a first storage server of the plurality of storage servers;
   constructing a virtual volume based on one of the plurality of storage servers, wherein data managed by the virtual volume remains accessible via the virtual volume when the data is moved from one of the plurality of storage servers to another of the plurality of storage servers and wherein at least part of the data is not stored by the first storage server;
   constructing a virtual backup device based on the physical backup device, wherein the physical backup device is accessible from each of the plurality of storage servers via the virtual backup device; and
   backing-up the data managed by the virtual volume to the virtual backup device by locating the data stored among the plurality of storage servers and identifying a path to transmit the data to the physical backup device via the first storage server.

2. The method as recited in claim 1, wherein said backing-up further comprises:
   identifying a set of storage servers that stores the data managed by the virtual volume, wherein the set of storage servers is a subset of the plurality of storage servers; and
   transmitting the data from the set of storage servers to the physical backup device via the first storage server.

3. The method as recited in claim 2, wherein said transmitting of the data comprises:
   upon a determination that the first storage server is one of the set of storage servers that store the data, locally transmitting part of the data that is stored in the first storage server to the physical backup device.

4. The method as recited in claim 2, wherein said transmitting of the data comprises:
   transmitting part of the data that is stored in a member of the set of storage servers to the first storage server, wherein the member is not the first storage server; and
   locally transmitting the part of the data from the first storage server to the physical backup device.

5. The method as recited in claim 1, wherein storage for the virtual volume can be moved among the plurality of storage servers without affecting the configuration of the virtual volume.

6. The method as recited in claim 1, further comprising:
   constructing a virtual server associated with a second storage server of the plurality of storage servers, wherein the virtual server contains the virtual volume, and the second storage server processes data requests transmitted from a client system to the virtual server.

7. The method as recited in claim 6, wherein the virtual volume and the virtual server are accessible via any one of the plurality of storage servers.

8. The method as recited in claim 1, wherein the method is embodied in a machine-readable storage medium as a set of instructions which, when executed by a processor, cause the processor to perform the method.

9. A method comprising:
   constructing a virtual volume in a clustered storage environment, wherein the clustered storage environment is based on a plurality of storage servers, and user data managed by the virtual volume is accessible via the virtual volume regardless of where the user data is stored in the plurality of storage servers;
   constructing a virtual backup device in the clustered storage environment for data backup;
   upon receiving a command to backup the virtual volume to the virtual backup device, identifying a first storage server of the plurality of storage servers, wherein the first storage server provides data storage to the virtual volume;
   identifying a second storage server of the plurality of storage servers, wherein the second storage server is physically connected with a physical backup device associated with the virtual backup device; and
   in response to the command, transmitting the user data from the first storage server to the physical backup device via the second storage server.

10. The method as recited in claim 9, further comprising:
    interconnecting the plurality of storage servers to form a clustered storage system; and
    presenting storage capacity in the clustered storage system to a client system via the clustered storage environment, wherein the clustered storage environment shields physical implementations of the virtual volume and the virtual backup device.

11. The method as recited in claim 9, wherein the virtual volume is referenced via a namespace which is linked with a global namespace structure for the clustered storage environment.

12. The method as recited in claim 9, wherein a data management application (DMA) initiates the command with a first namespace referencing the virtual volume, and a second namespace referencing the virtual backup device, wherein the first and the second namespaces are stored in a global namespace structure obtained from the clustered storage environment.

13. The method as recited in claim 9, wherein the physical backup device is a tape device, a tape library, or a virtual tape library.

14. The method as recited in claim 9, wherein each of the plurality of storage servers contains a D-module allowing access to data storage provided by any one of the plurality of storage servers via a cluster switching fabric.

15. The method as recited in claim 9, wherein the clustered storage environment is accessible via any one of the plurality of storage servers.

16. The method as recited in claim 9, wherein a virtual server is mapped to a storage server of the plurality of storage servers, and user data requests for the virtual server are transmitted to the storage server for processing.

17. The method as recited in claim 16, wherein each of the plurality of storage servers that is utilized for storing the user data contains a D-module to manage storage capacity provided by its respective storage server, and the first storage server can access the storage capacity via the D-module.

18. A method comprising:
receiving a command to restore data previously backed-up from a virtual volume to a virtual backup device, wherein the virtual volume and the virtual backup device are provided by a clustered storage environment implemented based on a plurality of storage servers;
identifying the virtual volume in the clustered storage environment by using a namespace uniquely assigned to the virtual volume;
identifying a first storage server of the plurality of storage servers as being connected with a physical backup device associated with the virtual backup device; and
transmitting the data from the physical backup device to a second storage server serving the virtual volume via the first storage server.

19. The method as recited in claim 18, wherein said identifying of the virtual volume comprises recreating the virtual volume upon a determination that the virtual volume no longer exists in the clustered storage environment.

20. The method as recited in claim 19, wherein said recreating of the virtual volume comprises selecting at least one of the plurality of storage servers for storing the data for the virtual volume.

21. A system comprising:
a plurality of storage servers to form a clustered storage environment; and
a physical backup device physically connected with a first storage server of the plurality of storage servers, wherein at least one of the plurality of storage servers is arranged to:
construct a virtual volume in the clustered storage environment, wherein the virtual volume shields its physical implementation from a client system and wherein at least part of the virtual volume is not stored by the first storage server,
construct a virtual backup device for the clustered storage environment, wherein the virtual backup device is associated with the physical backup device, and the virtual backup device shields its connectivity from the client system; and
backup data stored in the virtual volume to the virtual backup device by locating the data stored among the plurality of storage servers and identifying a path to transmit the data to the physical backup device via the first storage server.

22. The system as recited in claim 21, wherein a storage server of the plurality of storage servers is associated with a vserver in the clustered storage environment, the vserver contains the virtual volume, and user requests for the vserver are transmitted to the storage server.

23. The system as recited in claim 21, wherein said at least one of the plurality of storage servers is further arranged to:
identify a set of storage servers that is utilized by the virtual volume; and
transmit user data in the virtual volume from the set of storage servers to the physical backup device via the first storage server.

24. A storage system comprising:
a storage unit to store user data;
a physical backup device;
a data server to process a backup command received from a data management application (DMA), wherein the data server presents a clustered storage environment to the DMA; and
a backup engine coupled with the data server to
receive a backup instruction from the data server;
communicate with a second backup engine of a second storage system to locate the user data identified by the backup instruction, wherein the storage system and the second storage system are in a clustered storage system; and
transmit the user data to the physical backup device.

25. The system as recited in claim 24, wherein the data server is configured to:
retrieve a namespace path and a virtual backup device from the backup command;
identify a virtual volume associated with the namespace path;
identify a set of storage systems that is utilized by the virtual volume for storing the user data; and
communicate with backup engines of the set of storage systems for transmitting the user data from the set of storage systems to the physical backup device.

26. The system as recited in claim 25, wherein the data server is further configured to:
upon a determination that the storage system is one of the set of storage systems that store the user data, instruct the backup engine of the data server to transmit part of the user data stored in the storage unit to the physical backup device.

27. The system as recited in claim 25, wherein the data server is further configured to:
upon a determination that the storage system is not one of the set of storage systems that store the user data, communicate with the backup engines of the set of storage systems to transmit the user data to the backup engine of the data server; and
instruct the backup engine of the data server to backup the user data to the physical backup device.

* * * * *